Patented Apr. 5, 1927.

1,623,410

UNITED STATES PATENT OFFICE.

RICHARD HERZ, OF FRANKFORT-ON-THE-MAIN, AND JENS MÜLLER, OF HANAU-ON-THE-MAIN, GERMANY, ASSIGNORS TO GRASSELLI DYESTUFF CORPORATION, OF NEW YORK, N. Y., A CORPORATION OF DELAWARE.

GREEN BLUE TO GREEN VAT DYESTUFFS OF THE THIOINDIGO SERIES.

No Drawing. Application filed March 23, 1926, Serial No. 96,863, and in Germany October 25, 1924.

Our invention has for its object new and valuable dyestuffs of the thioindigo series, dyeing cotton and wool fast green-blue to green shades and having probably the general formula:

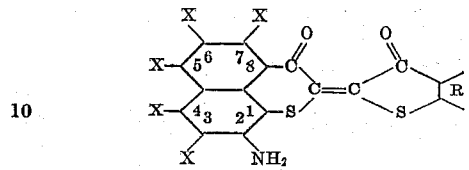

wherein the X's stand for hydrogen atoms, of which one or more may be replaced by a monovalent substituent, and R means an arylresidue of the benzine or naphthalene series, which may contain further substituents.

The new dyestuffs are the first green dyeing vat dyestuffs of the thioindigo series.

According to our invention 2-aminoperinaphthoxypenthiophenes of the general formula:

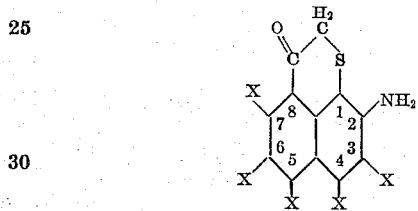

wherein the X's stand for hydrogen atoms, of which one or more may be replaced by a monovalent substituent, are condensed with a 2.3-diketodihydrothionaphthene compound of the general formula:

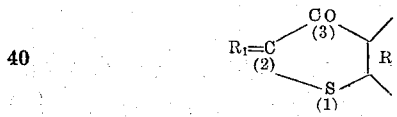

wherein R means an arylresidue of the benzene or naphthalene series, which may contain further substituents, and $R_1$ means oxygen, $Cl_2$ or $Br_2$, or an anilresidue.

In carrying out our process we may start also from a 2-acylamino perinaphthoxypenthiophene of the general formula:

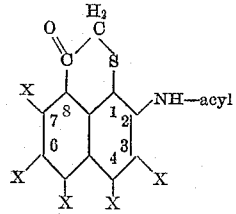

wherein the X's stand for hydrogen atoms, of which one or more may be replaced by a monovalent substituent, and split off the acylgroup by saponification either before the condensation or afterwards.

The dyestuffs, obtained according to our invention, may be further halogenized by treating them with halogenizing agents in the usual manner in suitable solvents or diluents.

The materials, dyed with the new dyestuffs, form also a part of our invention.

The following examples illustrate our invention, the parts being by weight and all temperatures in centigrade degrees:

Example 1.

(a) Producing 2-aminoperinaphthoxypenthiophene: 257 parts of 2-acetylaminoperinaphthoxypenthiophene, obtained for instance according to the process, described in the U. S. A. Letters Patent No. 1,498,913, are mixed with about 900 parts of spirit, then 450 parts of concentrated hydrochloric acid are added and the mass is heated on the water bath while stirring. When the saponification is finished, the mass is cooled down and the separated 2-aminoperinaphthoxypenthiophene (in form of its hydrochloride) is filtered off. To purify, it is extracted by boiling it with a spirit of about 50%, filtered and precipitated from the solution by adding an excess of concentrated hydrochloric acid. The 2-aminoperinaphthoxypenthiophene-hydrochloride, thus obtained, forms yellowish crystalline needles, which easily dissociate in water.

In a similar manner the sulfate may be obtained.

(b) Producing the dyestuff: 32.5 parts of 2-aminoperinaphthoxypenthiophene-hydrochloride are dissolved in 250 parts of hot glacial acetic acid, then 32.5 parts of crystallized sodium acetate and to this 48 parts of the 2-(para-dimethylamino)-anil of 2.3-diketodihydro-4.5-benzo-6-chloro-thionaphthene, suspended in about 700 parts of glacial acetic acid are then added. The mixture is heated to boiling for several hours while stirring.

The dyestuff, having probably the formula:

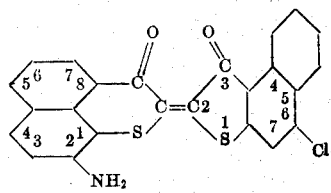

separates from the hot solution, it is filtered after cooling down, washed and dried.

The dyestuff is when dry a black-green powder, soluble in concentrated sulfuric acid to a blue solution. It forms with alkaline hydrosulfite a reddish vat and dyes cotton and wool from such a vat strong yellowish green shades.

The reactions described above may be formulated as follows:

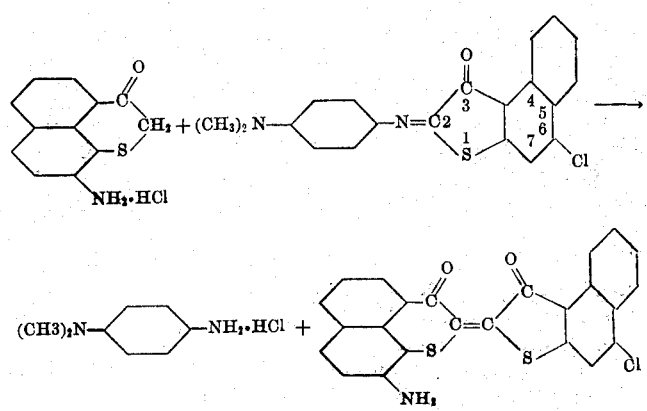

Example 2.

By substituting the anil used in example 1 by 40 parts of 5-chloro-2.3-diketodihydrothionaphthene- 2- (para-dimethylamino-)-anil and by effecting the condensation as above described, a dyestuff is obtained, having probably the formula:

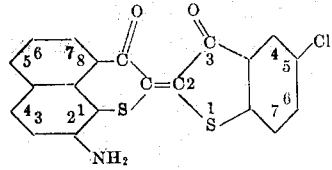

and dyeing cotton and wool in a dark yellow vat green-blue shades.

The dyeings are distinguished by an excellent fastness to light.

By substituting the anil of example 2 by 45 parts of the 4-methyl-5-chloro-7-methoxy - 2.3 - diketodihydrothionaphthene - 2- (para-dimethylamino)-anil, a dyestuff is obtained dyeing similar shades, having an excellent affinity to the fibre.

When 2 - aminoperinaphthoxypenthiophene is condensed with the 4.5.6-trichlor-2.3-diketodihydronaphthene-2-(para-dimethylanmino)-anil, a green dyeing dyestuff of a remarkable fastness to light is formed.

Example 3.

25.7 parts of 2-acetylaminopenthiophene obtainable according to U. S. A. Letters Patent No. 1.498.913 and 21.4 parts of 4.5-benzo - 2.3 - diketodihydrothionaphthene are heated together with 12 parts of anhydrous sodium acetate and 400 parts of acetic acid anhydride for some time to 80-90°. The dyestuff, which separates readily from the warm solution, is filtered, washed, and dried.

The dyestuff, thus obtained, dyes cotton and wool violet shades in the vat.

In order to split off the acetylgroup, the dyestuff is dissolved in concentrated sulfuric acid, and water is added, until an acid of 50% strength is formed. After boiling for some time, the separated dyestuff is filtered, washed and dried.

The dyestuff, having probably the formula:

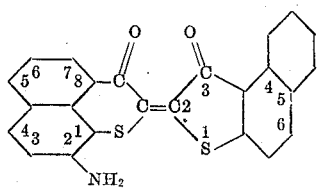

dyes cotton and wool dark green shades.

By using 2-acetylamino-6-bromo-perinaphthoxypenthiophene and by saponifying the product of condensation, a similar dyestuff is obtained, dyeing green shades with a more yellowish tint.

The term "penthiophene" for the purpose of the present invention, and as used in the appended claims, is intended to define a body having the ring structure indicated by the formula

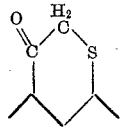

said term having been coined by Friedlaender (Liebig's "annalen der Chemie", vol. 388, page 12) to designate a six-membered ring containing 5 carbon atoms and a sulfur atom.

Having now particularly described and ascertained the nature of our said invention and in what manner the same is to be performed, we declare that what we claim is:

1. As new products vat dyestuffs of the thioindigo series, having probably the general formula:

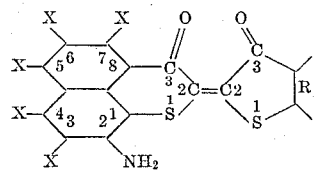

wherein the X's stand for hydrogen atoms, of which one or more may be replaced by a monovalent substituent, and R means an arylresidue of the benzene or naphthalene series, which may contain further substituents, which dyestuffs are when dry dark powders, soluble in concentrated sulfuric acid to a blue solution, and dye cotton and wool in a yellow to red to brownish vat fast green-blue to green shades, which dyestuffs may be obtained by condensing 2-aminoperinaphthoxypenthiophenes of the general formula:

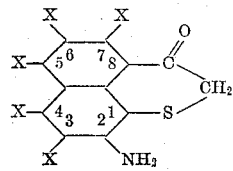

wherein the X's stand for hydrogen atoms, of which one or more may be replaced by a monovalent substituent, with 2.3-diketodihydrothionaphthene compounds of the general formula:

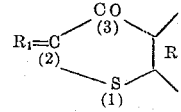

wherein R means an arylresidue of the benzene or naphthalene series, which may contain further substituents, and $R_1$ means oxygen, $Cl_2$, $Br_2$ or an anilresidue.

2. As new products vat dyestuffs of the thioindigo series, having probably the general formula:

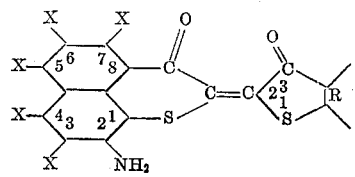

wherein the X's stand for hydrogen atoms, of which one or more may be replaced by a monovalent substituent, and R means an arylresidue of the benzene or naphthalene series, which may contain further substituents, which dyestuffs are when dry dark powders, soluble in concentrated sulfuric acid to a blue solution, and dye cotton and wool in a yellow to red to brownish vat fast green-blue to green shades, which dyestuffs may be obtained by condensing 2-acylaminoperinaphthoxypenthiophenes of the general formula:

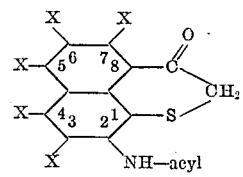

wherein the X's stand for hydrogen atoms, of which one or more may be replaced by a monovalent substituent, with 2.3-diketodihydrothionaphthene compounds of the general formula:

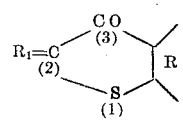

wherein R means an arylresidue of the benzene or naphthalene series, which may contain further substituents, and $R_1$ means oxygen, $Cl_2$ or $Br_2$ or an anilresidue, and splitting off the acylgroup by saponification.

3. As a new product a vat dyestuff of the thioindigo series, having probably the formula:

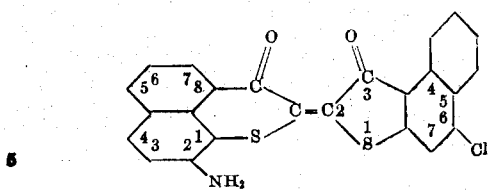

which dyestuff is when dry a black-green powder, soluble in concentrated sulfuric acid to a blue solution, and dyes cotton and wool in a reddish colored vat yellowish green shades, which dyestuff may be obtained by condensing 2-acylaminoperinaphthoxypenthiophene of the formula:

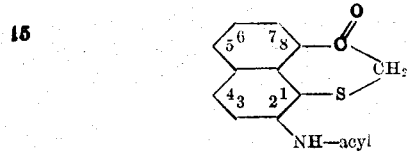

with a 2.3-diketodihydro-4.5-benzo-6-chlorothionaphthene compound of the formula:

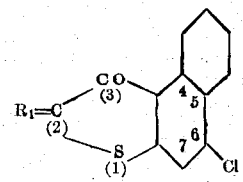

wherein $R_1$ means oxygen, $Cl_2$ or $Br_2$ or an anilresidue, and splitting off the acylgroup by saponification.

In testimony whereof, we affix our signatures.

RICHARD HERZ.
JENS MÜLLER.